(12) United States Patent
Shimada et al.

(10) Patent No.: US 9,360,341 B2
(45) Date of Patent: Jun. 7, 2016

(54) MAP PREPARATION APPARATUS AND COMPUTER-READABLE MEDIUM

(71) Applicant: FUJI XEROX CO., LTD., Minato-ku, Tokyo (JP)

(72) Inventors: Yuhei Shimada, Kanagawa (JP); Manabu Ueda, Kanagawa (JP); Hiroyuki Hattori, Kanagawa (JP); Yuichi Ueno, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 121 days.

(21) Appl. No.: 14/092,277

(22) Filed: Nov. 27, 2013

(65) Prior Publication Data
US 2014/0309926 A1 Oct. 16, 2014

(30) Foreign Application Priority Data
Apr. 12, 2013 (JP) ................................. 2013-083920

(51) Int. Cl.
*G01C 21/36* (2006.01)
*G01C 21/34* (2006.01)

(52) U.S. Cl.
CPC .......... *G01C 21/3679* (2013.01); *G01C 21/343* (2013.01); *G01C 21/3682* (2013.01)

(58) Field of Classification Search
CPC ........... G01C 21/3679; G01C 21/3682; G01C 21/343
See application file for complete search history.

(56) References Cited

U.S. PATENT DOCUMENTS

| 5,121,326 A * | 6/1992 | Moroto ................ G01C 21/367 340/995.15 |
| 2005/0261826 A1* | 11/2005 | Kurosawa .............. G01C 21/32 701/429 |
| 2007/0299605 A1* | 12/2007 | Onishi ................... G01C 21/20 701/532 |

FOREIGN PATENT DOCUMENTS

| JP | 2002-132140 A | 5/2002 |
| JP | 2006-038514 A | 2/2006 |
| JP | 2006105676 A * | 4/2006 |
| JP | 2007-199627 A | 8/2007 |
| JP | 2007271366 A | 10/2007 |
| JP | 2009-75652 A * | 4/2009 |
| JP | 2012052876 A | 3/2012 |
| JP | 2012168069 A | 9/2012 |

OTHER PUBLICATIONS

Communication dated Oct. 7, 2014, issued by the Japan Patent Office in corresponding Application No. 2013-083920.

* cited by examiner

*Primary Examiner* — Rodney Butler
(74) *Attorney, Agent, or Firm* — Sughrue Mion, PLLC

(57) ABSTRACT

A map preparation apparatus includes a position information acquisition section, an input information acquisition section, and a selection section. The position information acquisition section acquires position information of a user who is moving. The input information acquisition section acquires input information including a date and time when the user starts moving and a date and time when the user finishes moving. The selection section selects map information from preregistered map information on the basis of the position information acquired by the position information acquisition section and on the basis of the input information acquired by the input information acquisition section. The selected map information includes a route in a ratio equal to or larger than a predetermined ratio. The route is taken from the date and time when the user starts moving to the date and time when the user finishes moving.

11 Claims, 19 Drawing Sheets

| TOUR HISTORY ID | TIME | | LATITUDE | LONGITUDE |
|---|---|---|---|---|
| 001 | 03/15/2012 | 10:03:00 | 35.319031 | 139.550703 |
| ... | ... | ... | ... | ... |

| MAP ID | MAP NAME | UPPER LEFT LATITUDE | UPPER LEFT LONGITUDE | LOWER LEFT LATITUDE | LOWER LEFT LONGITUDE | LOWER RIGHT LATITUDE | LOWER RIGHT LONGITUDE | UPPER RIGHT LATITUDE | UPPER RIGHT LONGITUDE | CATEGORY |
|---|---|---|---|---|---|---|---|---|---|---|
| 0001 | MAP OF KAMAKURA TEMPLES | 35.325315 | 139.541559 | 35.310503 | 139.541903 | 35.311063 | 139.571514 | 35.333403 | 139.573402 | TEMPLE/ SHRINE |
| 0002 | ... | ... | ... | ... | ... | ... | ... | ... | ... | ... |
| 0005 | ... | ... | ... | ... | ... | ... | ... | ... | ... | ... |

| POINT-OF-INTEREST ID | NAME | LATITUDE | LONGITUDE | CATEGORY | ADVERTISEMENT |
|---|---|---|---|---|---|
| 01003 | DAITOKU TEMPLE | 35.325315 | 139.541559 | TEMPLE/SHRINE | NONE |
| 01004 | NOODLE SHOP IN FOREST | 35.333403 | 139.573402 | RESTAURANT | PRESENCE |
| 01005 | KAMAKURA STATION | 35.319031 | 139.550703 | STATION | NONE |
| ... | ... | ... | ... | ... | ... |

| MAP INFORMATION | MAP AROUND KAMAKURA STATION, MAP OF KAMAKURA TEMPLES, MAP OF RESTAURANTS (IN KAMAKURA) |
|---|---|
| POINT-OF-INTEREST INFORMATION | KAMAKURA STATION, TSURUGAOKA HACHIMAN-GU SHRINE, NOODLE SHOP IN FOREST, JUFUKU TEMPLE, MUSEUM OF MODERN ART, MYODEN TEMPLE, EISHO TEMPLE |

FIG. 9B

| SELECTED MAP INFORMATION | MAP OF KAMAKURA TEMPLES |
|---|---|
| SELECTED POINTS OF INTEREST WHICH HAVE BEEN PASSED | KAMAKURA STATION, TSURUGAOKA HACHIMAN-GU SHRINE, NOODLE SHOP IN FOREST, JUFUKU TEMPLE |
| SELECTED POINTS OF INTEREST WHICH HAVE NOT BEEN PASSED | MUSEUM OF MODERN ART, MYODEN TEMPLE, EISHO TEMPLE |

FIG. 17A

| MAP INFORMATION | MAP AROUND KAMAKURA STATION, MAP OF KAMAKURA TEMPLES, MAP OF RESTAURANTS (IN KAMAKURA) |
|---|---|
| POINT-OF-INTEREST INFORMATION | KAMAKURA STATION, TSURUGAOKA HACHIMAN-GU SHRINE, NOODLE SHOP IN FOREST, JUFUKU TEMPLE, MUSEUM OF MODERN ART, KAKUMU, RESTAURANT SHIZUKU |

FIG. 17B

| SELECTED MAP INFORMATION | MAP OF RESTAURANTS (IN KAMAKURA) |
|---|---|
| SELECTED POINTS OF INTEREST WHICH HAVE BEEN PASSED | KAMAKURA STATION, TSURUGAOKA HACHIMAN-GU SHRINE |
| SELECTED POINTS OF INTEREST WHICH HAVE NOT BEEN PASSED | NOODLE SHOP IN FOREST, KAKUMU, RESTAURANT SHIZUKU |

MAP PREPARATION APPARATUS AND COMPUTER-READABLE MEDIUM

CROSS-REFERENCE TO RELATED APPLICATIONS

This application is based on and claims priority under 35 USC 119 from Japanese Patent Application No. 2013-083920 filed Apr. 12, 2013.

BACKGROUND (i) Technical Field

The present invention relates to a map preparation apparatus and a computer-readable medium.

(ii) Related Art

A map preparation apparatus of the related art has been proposed which displays, for example, a travel route, a vehicle in which a user rode, and image information shot by the user riding in the vehicle on a map.

SUMMARY

According to an aspect of the present invention, there is provided a map preparation apparatus including a position information acquisition section, an input information acquisition section, and a selection section. The position information acquisition section acquires position information of a user who is moving. The input information acquisition section acquires input information including a date and time when the user starts moving and a date and time when the user finishes moving. The selection section selects map information from preregistered map information on the basis of the position information acquired by the position information acquisition section and on the basis of the input information acquired by the input information acquisition section. The selected map information includes a route in a ratio equal to or larger than a predetermined ratio. The route is taken from the date and time when the user starts moving to the date and time when the user finishes moving.

BRIEF DESCRIPTION OF THE DRAWINGS

Exemplary embodiments of the present invention will be described in detail based on the following figures, wherein:

FIG. 6 is a schematic view of an exemplary configuration of map information;

FIG. 7 is a schematic view of an exemplary configuration of point-of-interest information;

FIGS. 9A and 9B are diagrams for describing an operation of selecting map information and point-of-interest information;

FIGS. 17A and 17B are diagrams for describing an operation of selecting map information and point-of-interest information;

DETAILED DESCRIPTION

First Exemplary Embodiment

How to Use System

Figure 1:
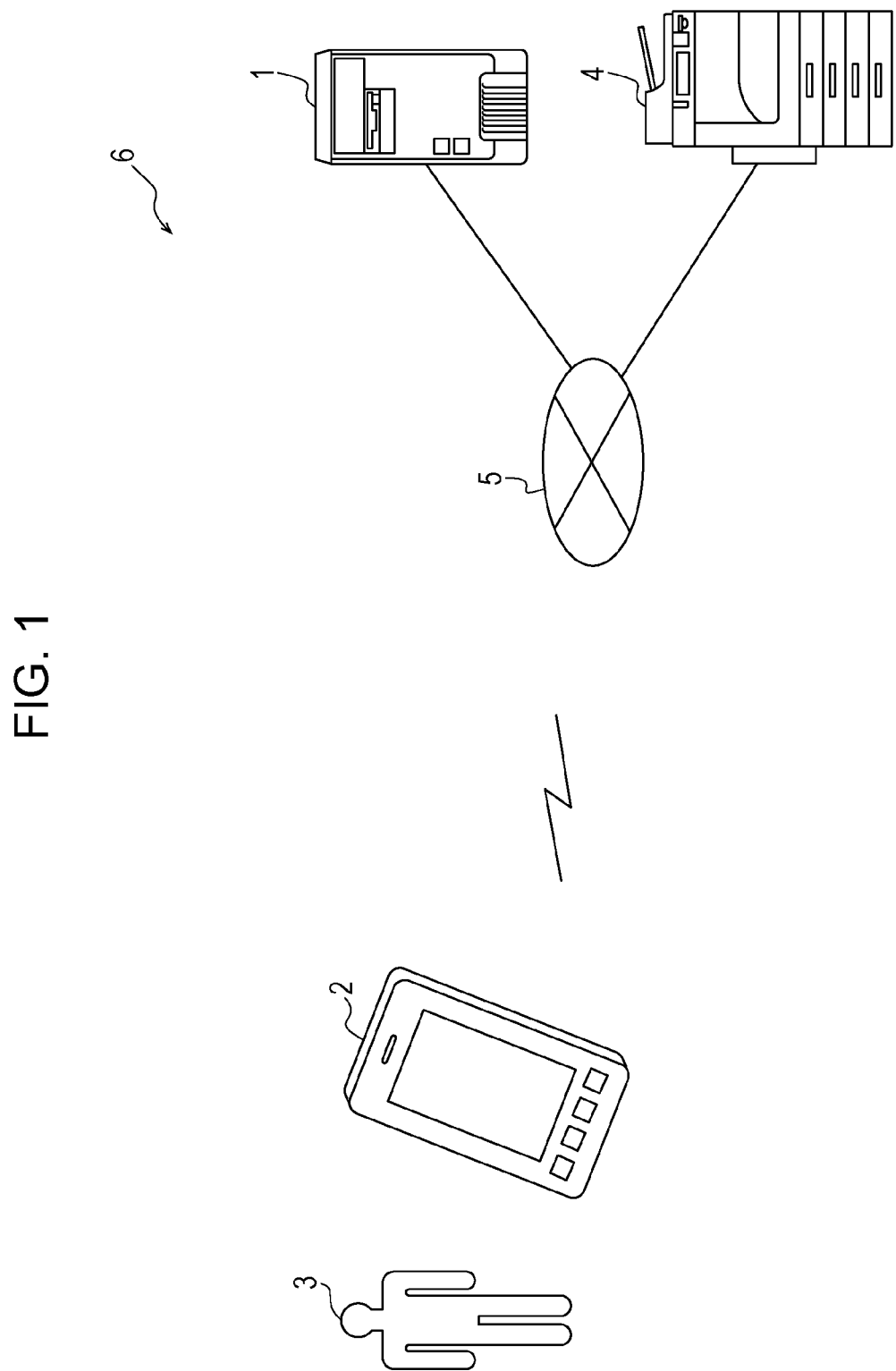
FIG. 1 is a schematic view of an exemplary configuration of a map preparation system.

FIG. 1 is a schematic view of an exemplary configuration of a map preparation system.

As illustrated in FIG. 1, a map preparation system 6 has a configuration in which a map preparation server 1 which generates map information, a terminal 2 carried by a user 3, and a printer 4 which prints the map information generated by the map preparation server 1 on a sheet of paper are connected via the Internet 5 so as to be capable of communicating with each other. FIG. 1 illustrates only one terminal 2 and only one printer 4, but multiple terminals 2 and multiple printers 4 may be connected via the Internet 5.

The user 3 moves with the terminal 2, for example, for sightseeing. The terminal 2, which is, for example, a cellular phone, obtains position information, and transmits the obtained position information to the map preparation server 1.

The map preparation server 1 receives position information obtained while the user 3 moves with the terminal 2, and generates map information corresponding to a route from the start to the end of the tour, in response to a request of the user 3. Specifically, the map preparation server 1 selects map information suitable for the route of the tour taken by the user 3, from pieces of map information stored in advance, and generates new map information by superimposing the route taken by the user 3 and point-of-interest information described below on the selected map information. A map which is called a tourist map obtained through deformation to facilitate sightseeing is used as the map information in many cases, but a map created through orthographic map projection may be used.

The map information generated by the map preparation server 1 is transmitted to the terminal 2 to be displayed on a display unit of the terminal 2, or is transmitted to the printer 4 to be printed on a sheet of paper.

In the first exemplary embodiment, a case in which the user 3 requests the map preparation server 1 to generate map information after the user 3 finishes a tour will be described.

Configuration of Map Preparation Server

Figure 2:
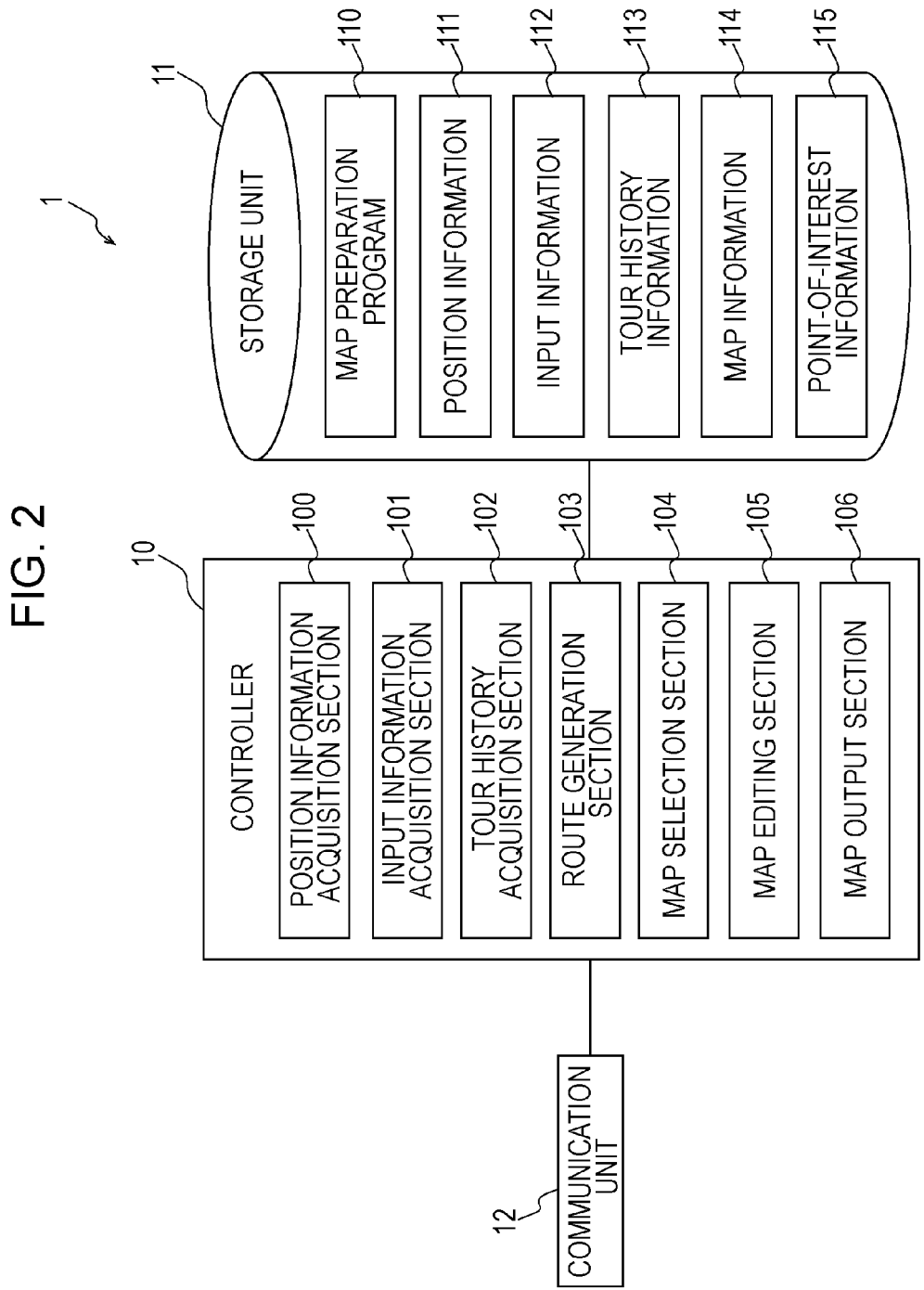
FIG. 2 is a block diagram illustrating an exemplary configuration of a map preparation server.

FIG. 2 is a block diagram illustrating an exemplary configuration of the map preparation server 1.

The map preparation server 1 includes a controller 10 that is constituted by, for example, a central processing unit (CPU) and that controls the units included in the map preparation server 1 and executes various programs, a storage unit 11 that is an exemplary storage device which is constituted by a recording medium, such as a hard disk drive (HDD) or a flash memory, and which stores information, and a communication unit 12 that communicates with the outside via a network.

The controller 10 executes a map preparation program 110 in the storage unit 11, thereby functioning as, for example, a position information acquisition section 100, an input information acquisition section 101, a tour history acquisition section 102, a route generation section 103, a map selection section 104, a map editing section 105, and a map output section 106.

The position information acquisition section 100 obtains position information 111 from the terminal 2 via the communication unit 12, and stores the position information 111 in the storage unit 11.

The input information acquisition section 101 obtains input information 112 which is input to the terminal 2 via the communication unit 12, and stores the input information 112 in the storage unit 11. In the first exemplary embodiment, at least a tour start time and a tour end time are obtained as the input information 112.

The tour history acquisition section 102 generates tour history information 113 indicating a route including time information, from the position information 111 obtained by the position information acquisition section 100, and stores the tour history information 113 in the storage unit 11.

The route generation section 103 generates a route candidate from the tour start time to the tour end time on the basis of the input information 112 and the tour history information 113.

The map selection section 104 selects one piece from pieces of map information 114 registered in advance, on the basis of the route indicated by the tour history information 113 and the route candidate generated by the route generation section 103.

The map editing section 105 edits the map information 114 selected by the map selection section 104 by adding the route, the route candidate, and point-of-interest information 115 described below to the map information 114.

The map output section 106 outputs the map information 114 edited by the map editing section 105 to the terminal 2 or the printer 4.

The storage unit 11 stores, for example, the map preparation program 110 for causing the controller 10 to function as the sections 100 to 106, the position information 111, the input information 112, the tour history information 113, the map information 114, and the point-of-interest information 115.

The point-of-interest information 115 is position information of sightseeing targets, such as a tourist attraction, a landmark, and a restaurant, (hereinafter referred to as "points of interest").

Configuration of Terminal

Figure 3:
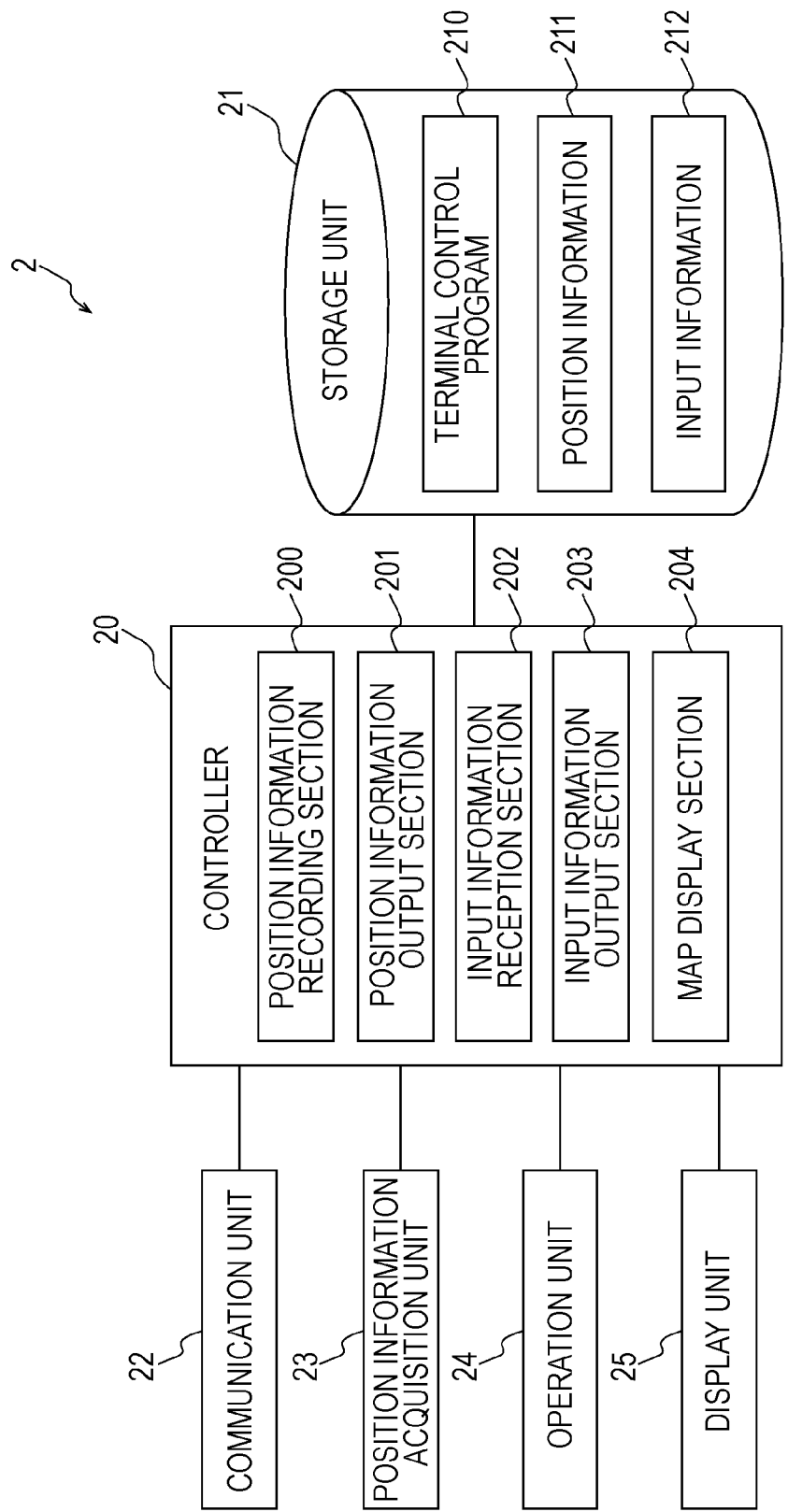
FIG. 3 is a block diagram illustrating an exemplary configuration of a terminal.

FIG. 3 is a block diagram illustrating an exemplary configuration of the terminal 2.

The terminal 2 includes a controller 20 that is constituted by, for example, a CPU and that controls the units included in the terminal 2 and executes various programs, a storage unit 21 that is an exemplary storage device which is constituted by a recording medium, such as a HDD or a flash memory, and which stores information, a communication unit 22 that communicates with the outside via a network, a position information acquisition unit 23 that receives global positioning system (GPS) information as position information of the terminal 2, an operation unit 24 constituted by a touch pad or operation keys, and a display unit 25 such as a liquid crystal display (LCD).

The controller 20 executes a terminal control program 210 in the storage unit 21, thereby functioning as, for example, a position information recording section 200, a position information output section 201, an input information reception section 202, an input information output section 203, and a map display section 204.

The position information recording section 200 temporarily records position information 211 obtained by the position information acquisition unit 23 in the storage unit 21.

The position information output section 201 outputs the position information 211 recorded by the position information recording section 200, to the map preparation server 1 via the communication unit 22.

The input information reception section 202 receives input information 212 which is input by the user 3 operating the operation unit 24, and temporarily stores the input information 212 into the storage unit 21.

The input information output section 203 outputs the input information 212 received by the input information reception section 202, to the map preparation server 1 via the communication unit 22.

The map display section 204 receives the map information 114 which is generated by the map preparation server 1 and which is output to the terminal 2, via the communication unit 22, and displays the map information 114 on the display unit 25.

The storage unit 21 stores, for example, the terminal control program 210 for causing the controller 20 to function as the above-described sections 200 to 204, the position information 211, and the input information 212.

A configuration may be employed in which the tour history acquisition section 102 of the map preparation server 1 is included in the terminal 2, and in which the tour history information 113 is generated in the terminal 2. Other sections and other information in the map preparation server 1 may be implemented in the terminal 2 as appropriate, and vice versa. Alternatively, the entire configuration may be centrally implemented in the terminal 2.

Figure 4:
FIG. 4 is a schematic view of an exemplary configuration of input information.

FIG. 4 is a schematic view of an exemplary configuration of the input information 112.

The input information 112, which is input by the user 3 using the terminal 2, includes a tour start time indicating a time when a tour starts, a tour start position indicating a latitude and a longitude, which is exemplary information about a position from which the tour starts, a tour end time indicating a time when the tour ends, and a tour end position indicating a latitude and a longitude where the tour ends. In the first exemplary embodiment, at least a tour start time and a tour end time may be input in order to specify the tour history information 113.

Figure 5:
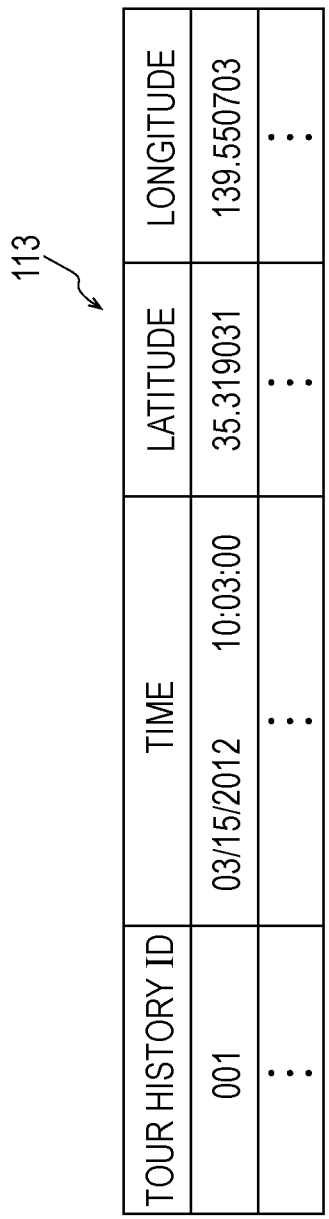
FIG. 5 is a schematic view of an exemplary configuration of tour history information.

FIG. 5 is a schematic view of an exemplary configuration of the tour history information 113.

The tour history information 113, which is information indicating a route generated by recording the position information of the user 3 with the time information, includes a tour history ID for identifying a tour, a time as the time information, and a latitude and a longitude as the position information.

FIG. 6 is a schematic view of an exemplary configuration of the map information 114.

As the map information 114, for example, a map created by a public office or a local association may be used, and a map whose scale is deformed may be used. The map information 114 includes a map ID for identifying map information, a map name indicating the map information name, latitudes and longitudes of the four corners of the map, and a category of the map information. Instead of the latitudes and the longitudes of the four corners of a map, latitudes and longitude of at least two vertexes among the four corners (for example, the vertexes on a diagonal line) may be included.

FIG. 7 is a schematic view of an exemplary configuration of the point-of-interest information 115.

The point-of-interest information 115, which is position information of sightseeing targets, such as a tourist attraction, a landmark, and a restaurant, includes a point-of-interest ID for identifying a point of interest, a name of the point of interest, a latitude and a longitude as position information of the point of interest, a category of the point of interest, and an advertisement of the point of interest.

Operations of Map Preparation Server

The operations in the exemplary embodiment will be described by classifying the operations into (1) a basic operation, (2) a tour-history-information acquisition operation, (3) an operation of selecting points of interest and map information, and (4) a map-information editing operation.

(1) Basic Operation

The user 3 carries the terminal 2, and moves for sightseeing with the terminal 2. When a tour starts, the user 3 operates the operation unit 24 to input an instruction to start the tour, to the terminal 2.

The position information recording section 200 of the terminal 2 obtains the position information 211 at predetermined time intervals, and the position information output section 201 transmits the position information 211 to the map preparation server 1.

The map preparation server 1 receives the position information 211 from the terminal 2, and stores the position information 211 as the position information 111 in the storage unit 11.

When the user 3 finishes the tour, the user 3 operates the operation unit 24 to input an instruction to end the tour, to the terminal 2.

When a tour history generation section (not illustrated) of the map preparation server 1 receives the instruction to end the tour, via the terminal 2, the tour history generation section generates the tour history information 113 on the basis of the position information 111 from the tour start to the tour end. The tour history information 113 is not limited to that stored in the map preparation server 1, and may be information which is generated in advance by the user 3 and stored in a server other than the map preparation server 1 and which is obtained from the outside server.

After the user 3 finishes the tour, the user 3 inputs input information to request generation of map information. In this operation, the user 3 first operates the terminal 2 so as to display a screen for inputting the tour start time and the tour end time as the input information.

In response to the operation of the user 3, the input information reception section 202 of the terminal 2 displays the input information accepting screen on the display unit 25.

Figure 8:
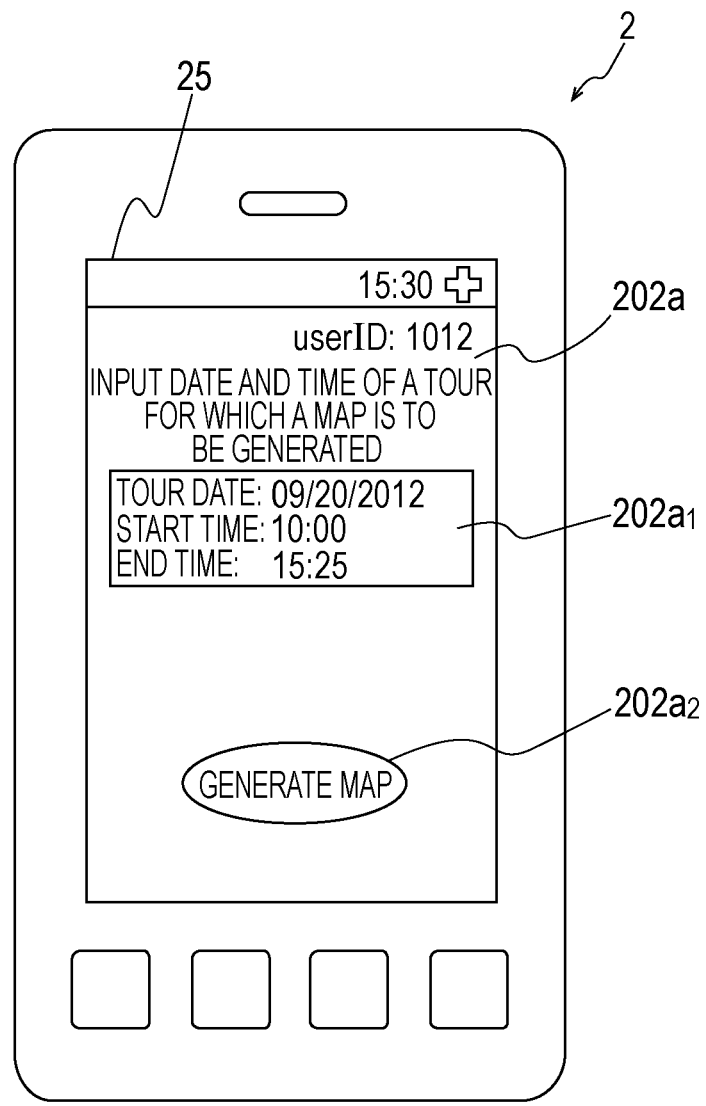
FIG. 8 is a schematic view of an exemplary configuration of an input information accepting screen displayed on a display unit of a terminal.

FIG. 8 is a schematic view of an exemplary configuration of the input information accepting screen displayed on the display unit 25 of the terminal 2.

An input information accepting screen 202a which is displayed on the display unit 25 of the terminal 2 includes an input box $202a_1$ for inputting a tour start time and a tour end time, and a button $202a_2$ for requesting generation of map information.

The user 3 inputs a tour start time and a tour end time in the input box $202a_1$, and operates the button $202a_2$ to request generation of map information. At least a tour start time and a tour end time need to be input to specify the tour history information 113. An exemplary equivalent operation may be employed in which all pieces of the tour history information 113 are displayed, and in which the user 3 is requested to select pieces of tour history information whose time range is included in (or overlapped by) the range from a tour start time to a tour end time, from the displayed tour history information candidates.

The input information reception section 202 of the terminal 2 stores the tour start time and the tour end time which are input in the input box $202a_1$, as the input information 212 in the storage unit 21.

The input information output section 203 of the terminal 2 outputs the input information 212 to the map preparation server 1.

Figure 11:
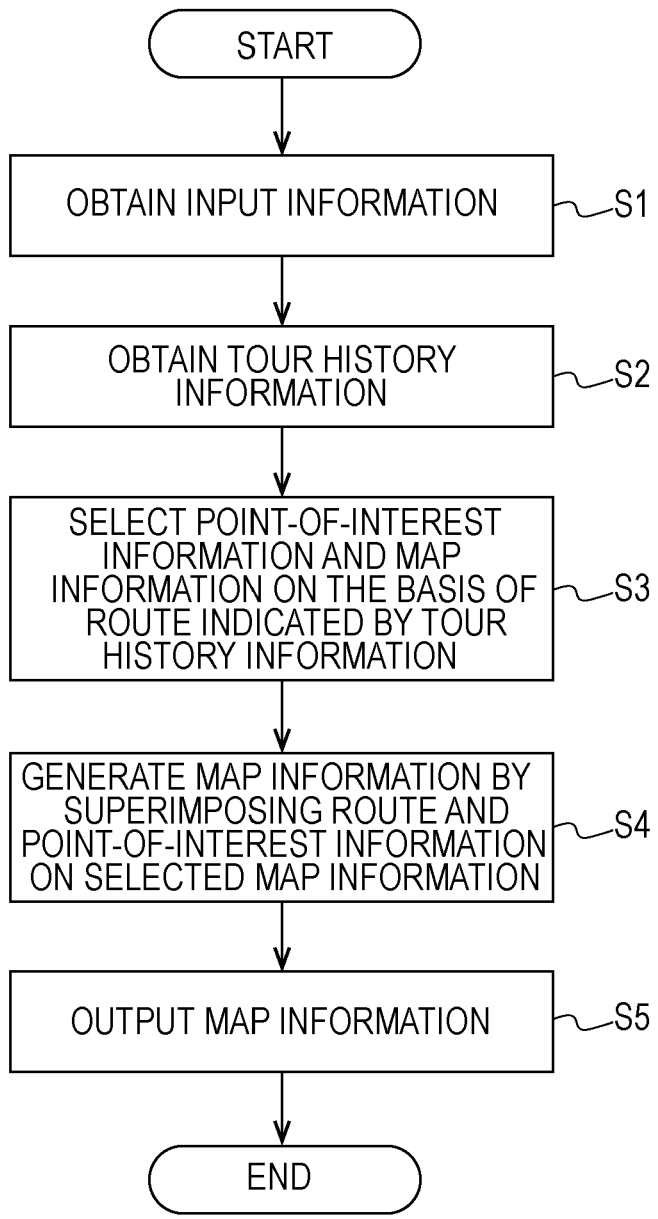
FIG. 11 is a flowchart of an exemplary basic operation performed by the map preparation server.

FIG. 11 is a flowchart of an exemplary basic operation performed by the map preparation server 1.

The input information acquisition section 101 of the map preparation server 1 obtains the input information 212 from the terminal 2, and stores the input information 212 as the input information 112 in the storage unit 11 (in step S1).

The tour history acquisition section 102 obtains pieces of the tour history information 113 included between the tour start time and the tour end time on the basis of the input information 112 (in step S2). The detail of step S2 will be described below in "(2) Tour-history-information acquisition operation".

The map selection section 104 selects the point-of-interest information 115 and the map information 114 on the basis of the route indicated by the tour history information 113 obtained by the tour history acquisition section 102 (in step S3). The detail of step S3 will be described below in "(3) Operation of selecting points of interest and map information".

The map editing section 105 generates map information by superimposing the generated route and the selected point-of-interest information 115 on the map information 114 selected by the map selection section 104 (in step S4).

The map output section 106 outputs the map information edited and generated by the map editing section 105, to the terminal 2 or the printer 4 (in step S5).

When the map information is output to the terminal 2, the terminal 2 receives the generated map, and displays the map on the display unit 25. When the map information is output to the printer 4, the printer 4 receives the generated map information, and prints the map on a sheet of paper.

(2) Tour-History-Information Acquisition Operation

Figure 12:
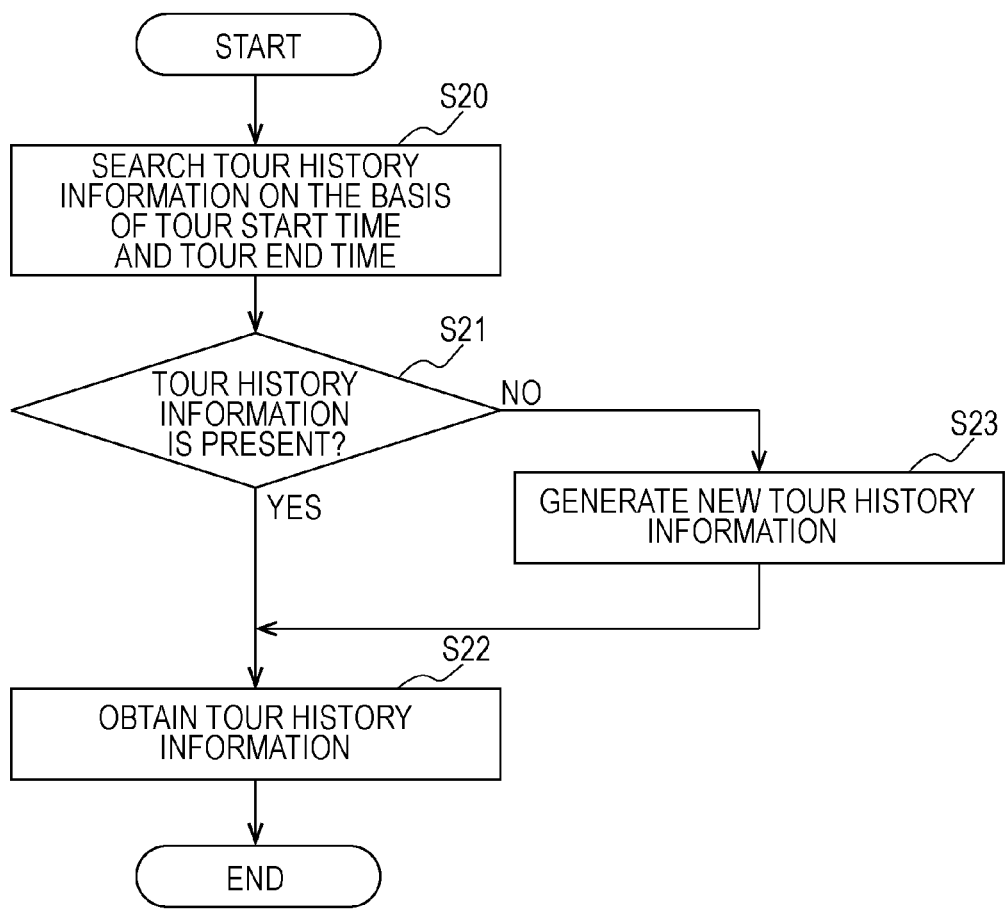
FIG. 12 is a flowchart of an exemplary tour-history-information acquisition operation performed by the map preparation server.

FIG. 12 is a flowchart of an exemplary tour-history-information acquisition operation performed by the map preparation server 1.

The tour history acquisition section 102 searches the tour history information 113 on the basis of the tour start time and the tour end time in the input information 112 (in step S20). The search result may be only pieces of the tour history information 113 whose time range is included completely in the range from the tour start time to the tour end time, or may be pieces of the tour history information 113 whose time range is overlapped by the range.

If the tour history information 113 as the search result in step S20 is present (Yes in step S21), the tour history information 113 for the tour is obtained (in step S22).

If the tour history information 113 as the search result is not present in step S21 (No in step S21), new tour history information 113 is generated by displaying a map on the display unit 25 of the terminal 2 to make the user 3 draw a route taken by the user 3, or by using a route taken by the most users (in step S23). Examples of the case in which the tour history information 113 as the search result is not present include a case in which a tour has not been actually made, a case in which the tour history information 113 fails to be generated due to the terminal 2 having difficulty obtaining position information, and a case in which some pieces of position information are missing so that the tour history information is not completed. In the case where some pieces of position information are missing, a new route is generated only for the missing section by using the above-described method.

(3) Operation of Selecting Points of Interest and Map Information

Figure 13:
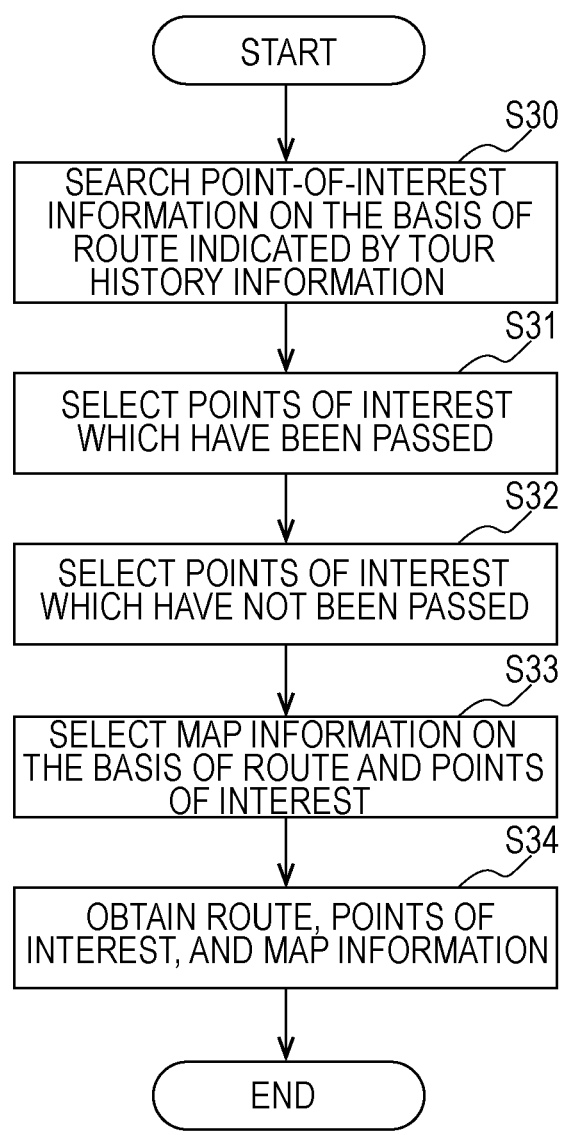
FIG. 13 is a flowchart of an exemplary operation of selecting points of interest and map information, which is performed by the map preparation server.

FIG. 13 is a flowchart of an exemplary operation of selecting points of interest and map information, which is performed by the map preparation server 1.

The map selection section 104 selects the point-of-interest information 115 about points of interest which are present in a predetermined area with respect to the route indicated by the tour history information 113 obtained in step S2, as points of interest which have been passed (in steps S30 and S31).

FIGS. 9A and 9B are diagrams for describing an operation of selecting the map information 114 and the point-of-interest information 115.

As illustrated in FIG. 9A, "Kamakura station", "Tsurugaoka Hachiman-gu Shrine", "Noodle shop in forest", "Jufuku Temple", "Museum of modern art", "Myoden Temple", and "Eisho Temple" are registered in the point-of-interest information 115. In this case, the map selection section 104 refers to the latitudes and the longitudes in the point-of-interest information 115 illustrated in FIG. 7, and selects "Kamakura station", "Tsurugaoka Hachiman-gu Shrine", "Noodle shop in forest", and "Jufuku Temple" as points of interest which have been passed and which are present in the predetermined area with respect to the route indicated by the obtained tour history information 113, as illustrated in FIG. 9B.

The map selection section 104 selects pieces of the point-of-interest information 115 which are present outside of the predetermined area with respect to the route, as points of interest which have not been passed (in step S32). In steps S31 and S32, points of interest may be automatically selected on the basis of preference information of the user 3 which is provided as additional information, or may be selected by the user 3.

The map selection section 104 refers to the latitudes and the longitudes in the point-of-interest information 115 illustrated in FIG. 7, and selects "Museum of modern art", "Myoden Temple", and "Eisho Temple" as points of interest which have not been passed and which are present outside of the predetermined area with respect to the route, as illustrated in FIG. 9B.

The map selection section 104 selects map information which matches a condition, from pieces of the map information 114 on the basis of the route indicated by the obtained tour history information 113 and the selected point-of-interest information (in step S33). The operation of selecting the map information 114 will be described in detail in FIG. 14.

The map editing section 105 obtains the route indicated by the obtained tour history information 113, the selected point-of-interest information 115, and the selected map information 114 (in step S34), and the process proceeds to step S4.

Figure 14:
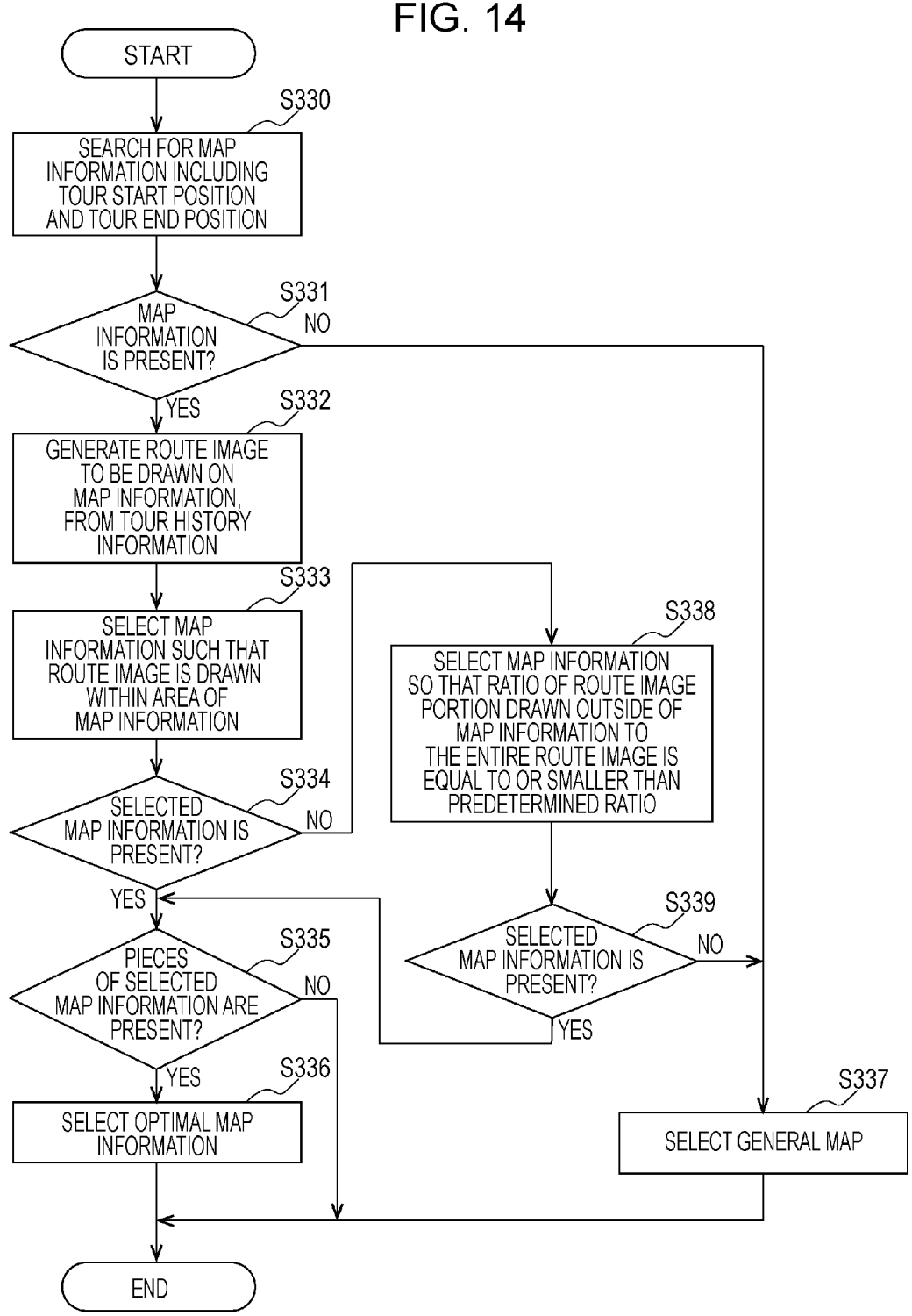
FIG. 14 is a flowchart of a detailed map-information selection operation performed by the map preparation server.

FIG. 14 is a flowchart of a detailed map-information selection operation in step S33, which is performed by the map preparation server 1.

The map selection section 104 searches for map information including the tour start position and the tour end position (in step S330). The tour start position and the tour end position are specified from the obtained tour history information 113 on the basis of the tour start time and the tour end time. In the searching of the map information 114, high priority is assigned to a map called a tourist map obtained through deformation to facilitate sightseeing.

If the map information 114 as the search result is present (Yes in step S331), a route image is generated to draw the route indicated by the tour history information 113 on the map information 114 (in step S332).

The map selection section 104 selects one or more pieces of the map information 114 such that the generated route image is drawn within the area of the selected map information 114 (in step S333).

If the map information 114 selected in step S333 is present (Yes in step S334), and if pieces of the extracted map information are present (Yes in step S335), the map selection section 104 selects optimal map information 114 (in step S336), and the process proceeds to step S34. In the selecting of optimal map information 114, a piece of the map information 114 may be selected so that a ratio of the route image drawn on the selected map information 114 to the map area is close to a predetermined ratio, or so that the area in which the route image is drawn is located in a center area of the map information 114. These may be provided to make the user 3 select optimal map information 114. Alternatively, a category may be determined on the basis of the point-of-interest information 115 selected in steps S30 and S31, and a piece of the map information 114 having a category which matches the determined category may be selected.

If the map information 114 as the search result is not present in step S331 (No in step S331), that is, if a map called a tourist map obtained through deformation to facilitate sightseeing is not present, a general map, that is, a map created through orthographic map projection is selected. A map may be used by cutting an area including the tour start position and the tour end position from a tourist map obtained through deformation or a general map.

If the map information 114 such that the generated route image is drawn within the area of the map information 114 is not present in step S334 (No in step S334), a piece of the map information 114 is selected so that the ratio of the route image portion which is drawn outside of the map information 114 to the entire route image is equal to or smaller than a predetermined ratio (in step S338).

If the map information selected in step S338 is present (Yes in step S339), the process proceeds to step S335. If the map information selected in step S338 is not present (No in step S339), a general map, that is, a map created through orthographic map projection is selected (in step S337).

Through the above-described operation, when "Map around Kamakura station", "Map of Kamakura temples", and "Map of restaurants (in Kamakura)" are registered in the map information 114 as illustrated in FIG. 9A, the map selection section 104 refers to the items in the map information 114 illustrated in FIG. 6, and selects "Map of Kamakura temples" as illustrated in FIG. 9B.

(4) Map-Information Editing Operation

Figure 15:
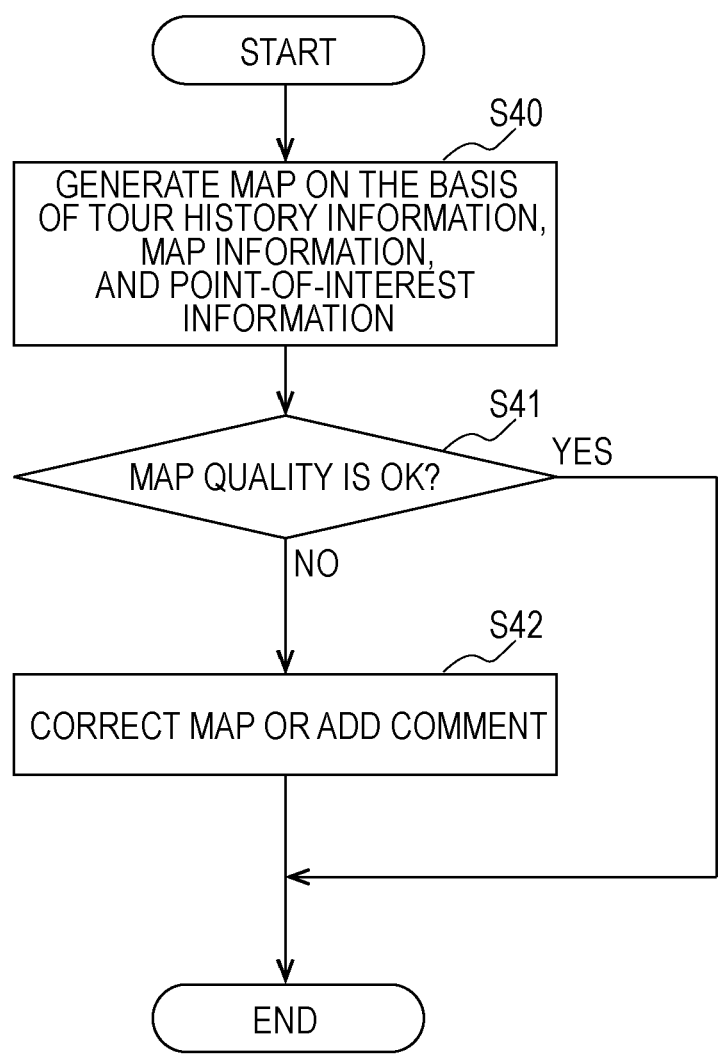
FIG. 15 is a flowchart of an exemplary map-information editing operation performed by the map preparation server.

FIG. 15 is a flowchart of an exemplary map-information editing operation performed by the map preparation server 1.

The map editing section 105 generates map information by superimposing the route image and the points of interest on the selected map information 114 on the basis of the tour history information 113, the map information 114, and the point-of-interest information 115 obtained in steps S2 and S3 (in step S40), and checks the quality of the map (in step S41).

In the checking of the quality of the map, for example, it is checked that the route image is drawn within the map area, that the points of interest are not drawn on the route image, and that the size of the map is not too large for that of the route.

For example, the map editing section 105 corrects the edited map information 114 or adds a comment on the edited map information 114 (in step S42), and the process proceeds to step S5. For example, when a point of interest is drawn on the route image, the map editing section 105 corrects the map information 114 so that the point of interest is moved to a position where the point of interest is not drawn on the route image. When a section of the route image is drawn outside of the map information 114, or when the size of the map is too large for that of the route, the map editing section 105 adds a comment about such a state, for example, to the outside of the map information 114.

Figure 10:
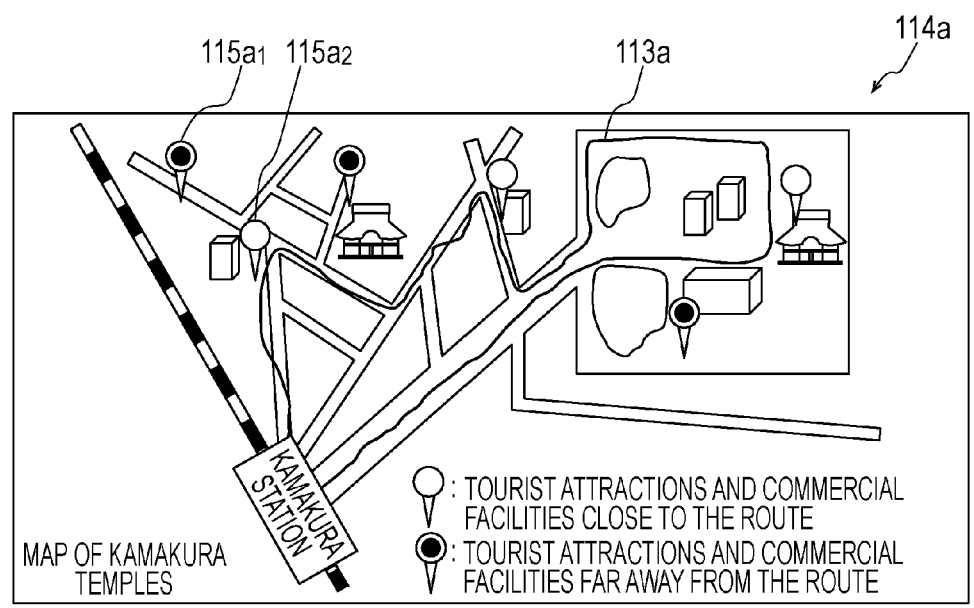
FIG. 10 is a schematic view of an exemplary configuration of edited map information.

FIG. 10 is a schematic view of an exemplary configuration of edited map information 114.

Map information 114a includes a route 113a which the user 3 has taken, a point of interest $115a_1$, close to which the user 3 has not passed, and a point of interest $115a_2$, close to which the user 3 has passed.

Effects of First Exemplary Embodiment

According to the above-described exemplary embodiment, after the user 3 finishes a tour, a tourist map is selected as the map information 114 on the basis of a route, along which the user 3 has moved, and the tourist map is edited by superimposing the route and the point-of-interest information 115 about points of interest, some of which the user 3 has passed and some of which the user 3 has not passed, on the tourist map, so as to be displayed, enabling selection of the map information 114 suitable for the route, along which the user 3 has moved.

As a secondary effect, the points of interest which the user 3 has passed are displayed as a record as well as a proposal that concerns a visit of the points of interest which have not been passed and that is provided when the user 3 makes a tour next time. In addition, instead of a general map, for example, the map information 114 in which emphasis and abbreviation are used to facilitate sightseeing is used, enabling the map information 114 suitable for the purpose of a tour of the user 3 to be selected.

Second Exemplary Embodiment

In a second exemplary embodiment, a case in which the user 3 requests the map preparation server 1 to generate map information in the middle of a tour will be described. Unless otherwise specified, operations similar to those in the first exemplary embodiment will not be described.
(1) Basic Operation When the user 3 requests generation of a map in the middle of a tour, the user 3 operates the operation unit 24 to notify the terminal 2 that the user 3 is in the middle of the tour.

Receiving the notification that the user 3 is in the middle of the tour, via the terminal 2, the map preparation server 1 generates the tour history information 113 on the basis of the position information 111 from the tour start position to the current position of the tour.

The user 3 inputs input information to request generation of map information. In this operation, the user 3 first operates the terminal 2 so as to display a screen for inputting the tour start time, a tour end time, and a tour end position as the input information.

Receiving the operation of the user 3, the input information reception section 202 of the terminal 2 displays an input information accepting screen on the display unit 25.

Figure 16:
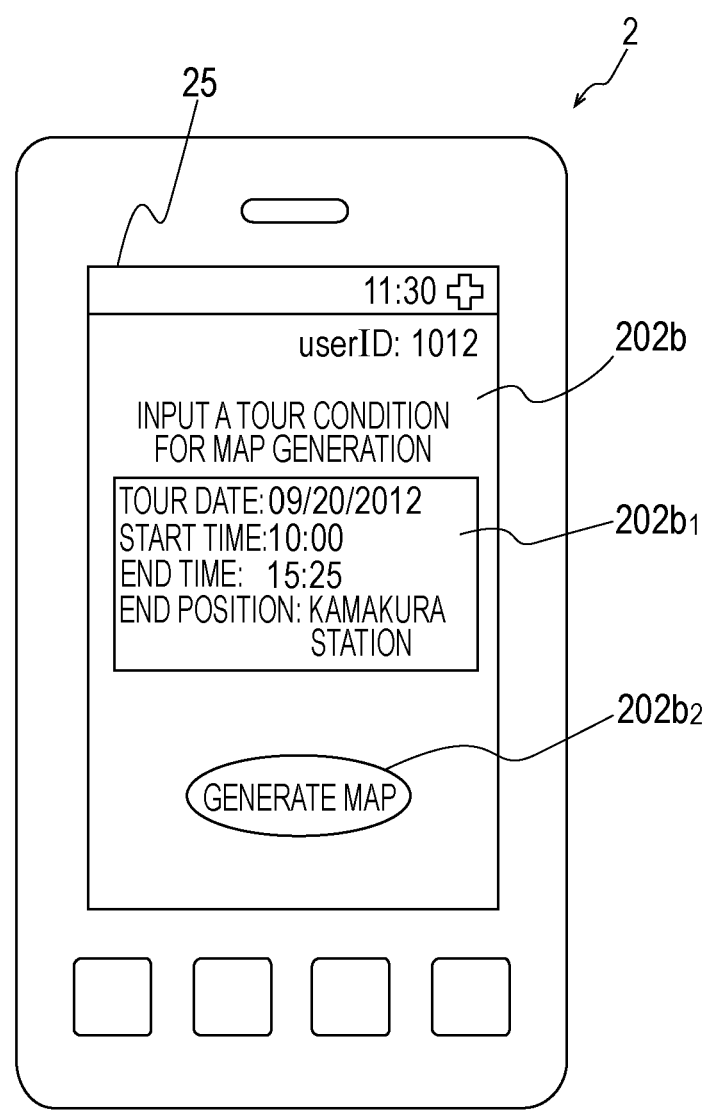
FIG. 16 is a schematic view of another exemplary configuration of an input information accepting screen displayed on a display unit of a terminal.

FIG. 16 is a schematic view of another exemplary configuration of an input information accepting screen displayed on the display unit 25 of the terminal 2.

An input information accepting screen $202b$, which is displayed on the display unit 25 of the terminal 2, includes an input box $202b_1$ for inputting a tour start time, a tour end time, and a tour end position, and a button $202b_2$ for requesting generation of map information.

The user 3 inputs the tour start time, a tour end time, and a tour end position in the input box $202b_1$, and operates the button $202b_2$ to request generation of map information.

The input information reception section 202 of the terminal 2 stores the tour start time, the tour end time, and the tour end position which are input in the input box $202b_1$, as the input information 212 in the storage unit 21.

The input information output section 203 of the terminal 2 outputs the input information 212 to the map preparation server 1.

In the subsequent operations of the map preparation server 1, an operation of selecting point-of-interest information from the tour start position to the current position in the middle of the tour is similar to that in the "first exemplary embodiment".

How to generate a route from the current position to the scheduled tour end time and position (hereinafter, referred to as a "route candidate") is different from that in the first exemplary embodiment, and will be described below in detail.

Figure 19:
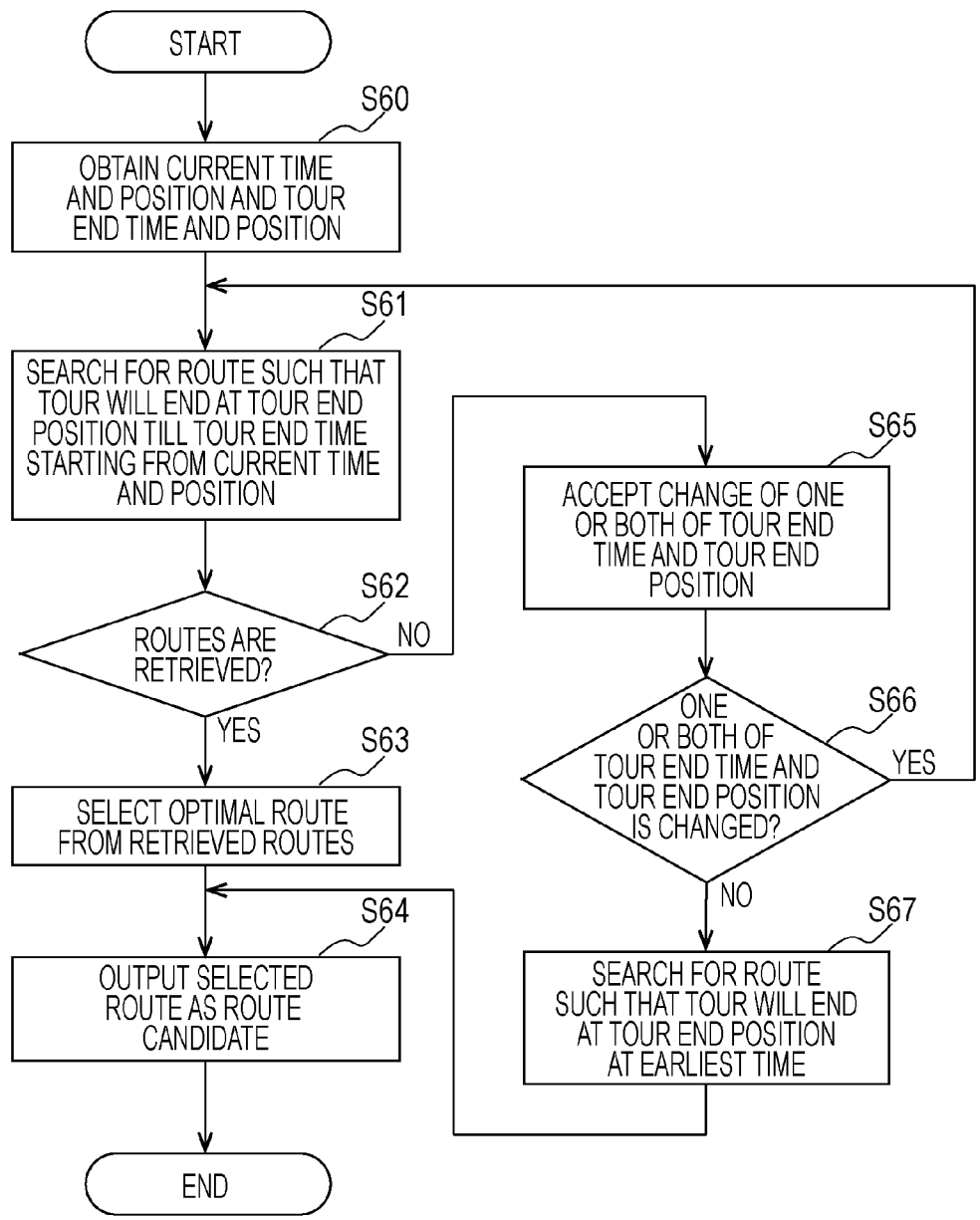
FIG. 19 is a flowchart of an exemplary operation of generating a route candidate, which is performed by the map preparation server.

FIG. 19 is a flowchart of an exemplary operation of generating a route candidate, which is performed by the map preparation server 1.

The route generation section 103 obtains the current time and position, and the tour end time and position (in step S60), and searches for a route such that the tour will end at the tour end position till the tour end time starting from the current time and position (in step S61).

If routes are retrieved in step S61 (Yes in step S62), an optimal route is selected on the basis of a condition from the retrieved routes (in step S63).

In the selecting of an optimal route, when there is point-of-interest information 115 that describes points of interest which have not been passed and that is selected on the basis of the route indicated by the tour history information 113 from the tour start position to the current position, a route such that the most points of interest in the point-of-interest information 115 which have not been passed will be passed may be selected. When the current time is the time to eat, a route along which many points of interest concerning restaurants are present may be selected with high priority. Alternatively, a user may select a route from displayed candidates.

The route generation section 103 outputs the selected route as a route candidate (in step S64), and the process proceeds to step S33 in FIG. 13.

If no routes are obtained through the search in step S62 (No in step S62), a change of one or both of the tour end time and the tour end position is accepted (in step S65).

If the user 3 changes one or both of the tour end time and the tour end position (Yes in step S66), the process returns back to step S61, and routes are retrieved again.

If the user 3 does not change one or both of the tour end time and the tour end position (No in step S66), a route such that the tour will end at the tour end position at the earliest time is retrieved (in step S67).

FIGS. 17A and 17B are diagrams for describing an operation of selecting the map information 114 and the point-of-interest information 115.

As illustrated in FIG. 17A, "Kamakura station", "Tsurugaoka Hachiman-gu Shrine", "Noodle shop in forest", "Jufuku Temple", "Museum of modern art", "Kakumu", and "Restaurant Shizuku" are registered in the point-of-interest information 115. In this case, the map selection section 104 refers to the latitudes and the longitudes in the point-of-interest information 115 illustrated in FIG. 7, and selects "Kamakura station" and "Tsurugaoka Hachiman-gu Shrine" as points of interest which have been passed and which are present in a predetermined area with respect to the route, as illustrated in FIG. 17B.

The map selection section 104 selects the point-of-interest information 115 about points of interest which are present outside of the predetermined area with respect to the route, as points of interest which have not been passed.

The map selection section 104 refers to the latitudes and the longitudes in the point-of-interest information 115 illustrated in FIG. 7, and selects "Noodle shop in forest", "Kakumu", and "Restaurant Shizuku" as points of interest which have not been passed and which are present outside of the predetermined area with respect to the route, as illustrated in FIG. 17B.

The map selection section 104 selects one piece from pieces of the map information 114 in accordance with a condition on the basis of the route and the route candidate generated by the route generation section 103, and on the basis of the selected point-of-interest information. A map-information selection operation is similar to that in the first exemplary embodiment.

A map-information editing operation is similar to that in the first exemplary embodiment.

Figure 18:
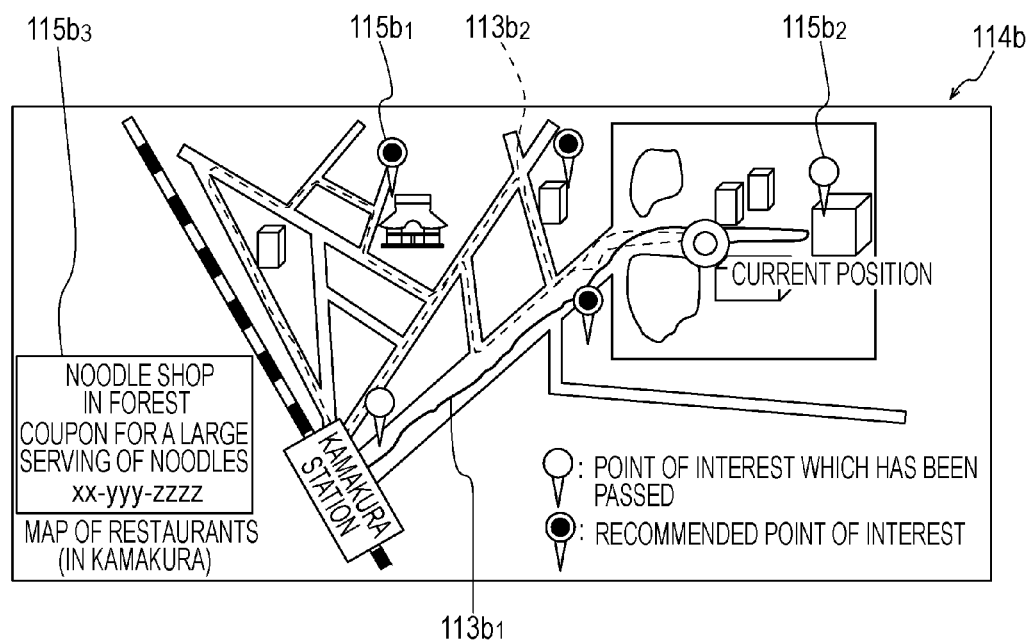
FIG. 18 is a schematic view of another exemplary configuration of edited map information.

FIG. 18 is a schematic view of another exemplary configuration of the edited map information 114.

Map information 114b includes a route 113$b_1$ taken by the user 3, a route candidate 113$b_2$ recommended to the user 3, a point of interest 115$b_1$, close to which the user 3 has not passed, a point of interest 115$b_2$, close to which the user 3 has passed, and an advertisement 115$b_3$ corresponding to a point of interest. The advertisement 115$b_3$ is one which will be used after the map information 114b is printed. Accordingly, the advertisement 115$b_3$ is desirably for a point of interest 115$b_1$ which has not been passed, but may be for a point of interest 115$b_2$ which has been passed.

Effects of Second Exemplary Embodiment

According to the above-described exemplary embodiment, in the middle of the tour, the user 3 selects the map information 114 on the basis of the route along which the user 3 has moved and the route candidate along which the user 3 will move, and the map information 114 is edited by superimposing the route, the route candidate, and the point-of-interest information 115 about points of interest, some of which have passed and some of which have not passed, on the map information 114, enabling selection of the map information 114 suitable for the route along which the user 3 has moved and the route candidate along which the user 3 will move. As a secondary effect, the points of interest which the user 3 has passed are displayed as a record as well as a sightseeing target proposal which suggests that the user 3 visit the points of interest which have not been passed, till the tour end.

Other Exemplary Embodiment

The present invention is not limited to the above-described exemplary embodiments, and various modifications may be made without departing from the gist of the present invention.

For example, map information may be generated before a tour starts. In this case, a user needs to input a tour start time, a tour start position, a tour end time, and a tour end position as input information. A route candidate from the tour start position to the tour end position may be generated in a way similar to that of generating a route candidate from a current position to a tour end position, which is described in the second exemplary embodiment.

In the above-described exemplary embodiments, the sections 100 to 106 and 200 to 204 of the controller 10 are achieved by using programs. Some or all of the sections may be achieved through hardware such as an application-specific integrated circuit (ASIC). The programs used in the above-described exemplary embodiments may be provided by storing them in a recording medium such as a compact disc-read-only memory (CD-ROM). In addition, as long as the gist of the present invention is not changed, steps described in the above-described exemplary embodiments may be switched, or a step may be, for example, deleted or added.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A map preparation apparatus comprising:
   a position information acquisition section configured to acquire position information of a user who is moving;
   an input information acquisition section configured to acquire input information including a date and time when the user starts moving and a date and time when the user finishes moving; and
   a selection section configured to select map information from preregistered map information on the basis of the position information acquired by the position information acquisition section and on the basis of the input information acquired by the input information acquisition section,
   wherein the selection section is configured to select first map information, which has a map area that permits a route image to be drawn therein, from among the preregistered map information, in response to at least one of the preregistered map information having a map are sized so as to permit the route image to be drawn therein,
   wherein the selection section is configured to select second map information so that a ratio of the route image to a map area is greater than or equal to a predetermined ratio, in response to no preregistered map information having a map area sized so as to permit the route image to he drawn therein, and
   wherein the route image is an image of the route being taken from the date and time when the user starts moving to the date and time when the user finishes moving.

2. The map preparation apparatus according to claim 1, further comprising:

an editing section configured to edit the map information selected by the selection section by superimposing the route on the selected map information; and an output section configured to output map information edited by the editing section.

3. The map preparation apparatus according to claim 2, wherein the selection section is configured to select point-of-interest information about a point of interest which the user has passed and point-of-interest information about a point of interest which the user has not passed, from a plurality of pieces of point-of-interest information which indicate position information of a preregistered sightseeing target, on the basis of the route, and wherein the editing section is configured to edit the selected map information by further superimposing the point-of-interest information selected by the selection section on the map information.

4. A map preparation apparatus comprising:

an input information acquisition section configured to acquire input information including a scheduled date and time and a scheduled position at which a user will start moving and a scheduled date and time and a scheduled position at which the user will finish moving;

a route generation section configured to generate a route candidate from the scheduled position where the user will start moving to the scheduled position where the user will finish moving, on the basis of the input information acquired by the input information acquisition section; and a selection section configured to select map information from preregistered map information, the selected map information including the route candidate generated by the route generation section, wherein the selection section is configured to select first map information, which has a map area that permits a route image to be drawn therein, from among the preregistered map information, in response to at least one of the preregistered map information having a map area sized so as to permit the route image to be drawn therein, the selection section is configured to select second map information so that a ratio of the route image to a map area is greater than or equal to a predetermined ratio, in response to no preregistered map information having a map area sized so as to permit the route image to be drawn therein, and wherein the route image is an image of the route being taken from the date and time when the user starts moving to the date and time when the user finishes moving.

5. The map preparation apparatus according to claim 4, further comprising:

an editing section configured to edit the map information selected by the selection section by superimposing the route on the selected map information; and an output section configured to output map information edited by the editing section.

6. The map preparation apparatus according to claim 5, wherein the selection section is configured to select point-of-interest information about a point of interest which the user has passed and point-of-interest information about a point of interest which the user has not passed, from a plurality of pieces of point-of-interest information which indicate position information of a preregistered sightseeing target, on the basis of the route, and wherein the editing section is configured to edit the selected map information by further superimposing the point-of-interest information selected by the selection section on the map information.

7. A map preparation apparatus comprising:

a position information acquisition section configured to acquire position information of a user who is moving;

an input information acquisition section configured to acquire input information including a date and time and a position at which the user has started moving and a scheduled date and time and a scheduled position at which the user will finish moving;

a route generation section configured to generate a route candidate from a current position of the user determined based on the position information of the user acquired by the position information acquisition section, to the scheduled position at which the user will finish moving and which is included in the input information acquired by the input information acquisition section; and a selection section configured to select map information from preregistered map information, the selected map information including a route which the user has taken and the route candidate, wherein the selection section is configured to select first map information, which has a map area that permits a route image to be drawn therein, from among the preregistered map information, in response to at least one of the preregistered map information having a map area sized so as to permit the route image to be drawn therein, the selection section is configured to select second map information so that a ratio of the route image to a map area is greater than or equal to a predetermined ratio, in response to no preregistered map information having a map area sized so as to permit the route image to be drawn therein, and the route image is an image the route being taken from the date and time when the user has started moving to a current date and time.

8. The map preparation apparatus according to claim 7, further comprising:

an editing section configured to edit the map information selected by the selection section by superimposing the route on the selected map information; and an output section configured to output map information edited by the editing section.

9. The map preparation apparatus according to claim 8, wherein the selection section is configured to select point-of-interest information about a point of interest which the user has passed and point-of-interest information about a point of interest which the user has not passed, from a plurality of pieces of point-of-interest information which indicate position information of a preregistered sightseeing target, on the basis of the route, and wherein the editing section is configured to edit the selected map information by further superimposing the point-of-interest information selected by the selection section on the map information.

10. A non-transitory computer readable medium storing a program causing a computer to execute a process for preparing a map, the process comprising:

acquiring position information of a user who is moving;

acquiring input information including a date and time when the user starts moving and a date and time when the user finishes moving;

selecting first map information, which has a map area that permits a route image to be drawn therein, from among the preregistered map information, from preregistered map information on the basis of the acquired position information and on the basis of the acquired input information, in response to at least one of the preregistered map information having a map area sized so as to permit the route image to be drawn therein:

selecting second map information so that a ratio of the route image to a map area is greater than or equal to a predetermined ratio, in response to no preregistered map information having a map area sized so as to permit the route image to be drawn therein, the route being taken from the date and time when the user starts moving to the date and time when the user finishes moving;

editing the selected map information by superimposing the route on the selected map information; and outputting the edited map information.

11. A map preparation apparatus comprising:

a first acquisition section configured to acquire position information of a user;

a second acquisition section configured to acquire input information including a date and time when the user starts moving;

a computation section configured to compute a route which the user has taken from the date and time when the user started moving to a date and time when the user finished moving, or from the date and time when the user started moving to a current date and time, on the basis of the position information acquired by the first acquisition section and the input information acquired by the second acquisition section; and a selection section configured to select map information from a plurality of preregistered map information, the selected map information including the route computed by the computation section, wherein the selection section is configured to select first map information, which has a map area that permits a route image to be drawn therein, from among the preregistered map information, in response to at least one of the preregistered map information having a map area sized so as to permit the route image to be drawn therein, wherein the selection section is configured to select second map information so that a ratio of the route image to a map area is greater than or equal to a predetermined ratio, in response to no preregistered map information having a map area sized so as to permit the route image to be drawn therein, and wherein the route image is an image of the route being taken from the date and time when the user starts moving to the date and time when the user finishes moving.

\* \* \* \* \*